United States Patent

[11] 3,619,455

[72] Inventors Ira T. Clement
Glen Mills;
Anthony L. Tuno, Philadelphia; Edmond R. Ayella, Philadelphia, all of Pa.
[21] Appl. No. 722,539
[22] Filed Apr. 19, 1968
[45] Patented Nov. 9, 1971
[73] Assignee Pennsylvania Fluorocarbon Company, Inc.
Clifton Heights, Pa.

[54] HEAT DEFORMABLE ELASTOMERIC ARTICLES
10 Claims, No Drawings

[52] U.S. Cl. ................................................... 264/230,
117/232, 260/23.7 M, 260/41.5 R, 260/890,
264/94
[51] Int. Cl. ........................................................ C08d 9/04,
C08f 29/22, B29c 13/00

[50] Field of Search ........................................... 260/890;
264/230

[56] References Cited
UNITED STATES PATENTS
3,042,652  7/1962  Pariser et al. ................. 260/890
3,147,318  9/1964  Jungk ........................... 260/890
FOREIGN PATENTS
1,038,023  8/1966  Great Britain ................ 260/890

*Primary Examiner*—Samuel H. Blech
*Attorney*—Morgan, Finnegan, Durham & Pine

ABSTRACT: Elastomeric articles which can be shrunk by the application of heat are made from a blend of a cured polychloroprene elastomer and a polychloroprene elastomer having a Williams Plasticity Number of more than 1,000° at 100° F. and less than 350° at 150° F.

HEAT DEFORMABLE ELASTOMERIC ARTICLES

This invention relates to shaped elastomeric articles which can be deformed by heat, the articles being made from a blend of chloroprene polymers hereinafter described. The invention also embodies a method of preparing such articles. The articles have numerous uses. For example, heat shrinkable tubing can be placed over pipe joints and can than be shrunk thereby providing a tight fitting protective cover. Another use of heat shrinkable tubing is the harnessing and jacketing of electrical wires. The articles are elastomeric, both before and after deforming, and thus have the usual advantages which this property imparts.

The articles are formed from a homogeneous blend of two components, (1) a cured polychloroprene elastomer and (2) a polychloroprene elastomer having a Williams Plasticity Number (ASTM—D-926-56) of at least 1000 at 100° F. and less than 350 at 150° F. The amount of each component in the blend should be between 10 percent and 90 percent (all percentages herein are by weight) of the total blend. Preferably the amount of component (1) is 10 to 50 percent and the amount of component (2) is 50 to 90 percent.

The chloroprene polymer of component (1) can be any of the conventional solid chloroprene polymers such as those marketed commercially under the trademark "Neoprene." They can be the sulfur modified chloroprene polymers, most of these being known commercially as the "G" types, or can, if desired, not contain sulfur in the polymer chain, most of these latter types being known commercially as the "W" types. The uncured elastomers of component (1) normally have a molecular weight distribution of 20,000 to over 1,000,000 with the most abundant molecular species being in the range of 80,000 to 250,000 (I. and E.C. 43, 154-157, 1951). The polymers are normally (before curing) soluble in benzene. They are also solid as this latter term is defined in U.S. Pat. No. 3,147,318 with their Mooney viscosity preferably being 35 to 65 at 158° F. (ML—2.5 min). The methods of preparing these chloroprene elastomers are well known to those skilled in the art; see, for example, U.S. Pats. Nos. 3,042,652; 3,147,317; 2,494,087; 2,481,044; 2,914,497; 2,567,009; and 2,831,842. More specifically, see the first chloroprene polymer preparation described in example I of U.S. Pat. No. 3,147,318.

Component (2) is a chloroprene polymer having a rapid change in its Williams Plasticity Number. At 100° F. the Williams Plasticity Number is at least 1000 whereas at 150° F. it is less than 350, preferably less than 300, more preferably less than 250. Component (2) is distinguished from the polymer of component (1) (before curing in that at about 150° F. its Williams Plasticity Number is lower than that of component (1), usually by at least 50 units, whereas at about 120° F. the reverse is true; i.e., at this temperature the Williams Plasticity Number of component (2) will be about 1000 or higher whereas that of component (1) will be substantially less than 1000, say 500 to 700. Preferably the Williams Plasticity Number of component (2) is about 150 to 250 at 150° F. and over 1000 at 120° F. and the Williams Plasticity Number of component (1), before curing, is about 375 to 475 at 150° F. and 500 to 900 at 120° F.

The polymers of component (2) also have a fast rate of crystallization as this is characteristic of chloroprene polymers having a rapid change in Williams Plasticity Number. The polymers of component (2) are prepared in conventional manner but at a polymerization temperature not higher than about 50° F. It is well known that rapid crystallizing polymers, i.e., those exhibiting a rapid change in Williams Plasticity Number, are prepared at low temperatures whereas the more slowly crystallizing polymers are usually prepared at about 110° to 125° F. Suitable means of preparing the polymer of component (2) are described in Maynard et al., Journal of Polymer Science, Vol. 18, pp. 227-34 (1955) and U.S. Pat. Nos. 2,417,034; 2,426,854; 2,567,117. Such polymers are also widely available commercially, e.g., that marketed under the trademark "Neoprene HC" by the DuPont Company.

The articles of the invention are formed by first mixing component (1) with component (2) on a conventional rubber mill. During this mixing step the curing agent is also added. Any of the conventional chloroprene elastomer curing agents may be employed such as magnesium, lead and zinc oxides, alone or in combination with conventional accelerators such as 2-mercaptoimidazoline. If desired other additives desired such as stearic acid, butyl oleate, carbon black, antioxidants, etc., are also added in the milling step. However, it is preferred that no other polymers other than chloroprene polymers be included in the composition. Chloroprene elastomers have desirable properties peculiar to themselves and these properties are usually reduced or lost by the inclusion of substantial amounts of other polymers.

After the milling step is complete, i.e., after the blend is homogeneous, the blend is formed into the desired shape. If, for example, heat shrinkable tubing is desired, the blend is extruded into tubing on a conventional elastomer extruder. The extrusion temperature will usually be about 170° F. but will vary depending upon the desired shape of the article, the composition of the material, and the like.

The shaped blend is then cured. This is accomplished in conventional manner but most extruded goods are usually cured in open steam for 20 to 120 minutes, although the time will vary depending upon such factors as the thickness of the article and the like. Alternatively, other curing means such as hot air, irradiation and the like may be employed if desired. During the curing step component (1) cures but there is no substantial curing of component (2) due to its physical properties described hereinbefore. Although the extent of curing will vary depending upon the use to which the ultimate article is to be put it will usually be such that at room temperature the blend will have a tensile strength of at least 500 p.s.i.

The shaped and cured blend is then expanded into the desired shape. This is effected in any convenient manner but normally involves the application of pressure while maintaining the temperature at 200° to 250° F. Once the expanded form is achieved the article is cooled to, say, room temperature before relieving the pressure. When cooled the pressure is relieved and the article will retain its expanded form. In the expanded state the article is elastomeric, i.e., it has the characteristic property of rubber in that it deforms under relatively small force but returns to essentially its original configuration when the force is relieved.

The expanded article can now be shrunk merely by heating. Normally heating to about 125° F. will cause some shrinkage with full shrinkage occurring at about 160° F. Full shrinkage means shrinking to the original shape, i.e., the shape of the article, before the expansion step.

In some cases it may be observed that the milling of component (1) and component (2) together takes longer than is desired. This sometimes occurs because these two components are not always as compatible as they might be. In such cases the milling time can be reduced by the addition to the blend of a fluid chloroprene polymer. These polymers are prepared as described in U.S. Pat. No. 3,147,317 but, in general, are prepared in the same manner as the polymer of component (1) except that a sufficient amount of a conventional chain transfer agent is used to reduce the viscosity, say about five parts of a xanthogen disulfide per 100 parts of chloroprene. These fluid chloroprene polymers have an intrinsic viscosity in benzene at 80° F. of less than 0.15. They can also be described as fluid because they are pourable at 130° F. When a fluid chloroprene polymer is used to improve the processability it should only be used in about 1 to 15 percent based on the total weight of the three chloroprene components. Preferably the amount used is only about 5 percent. Rather than use a fluid chloroprene polymer other pourable (at 130° F.) elastomeric polymers such as polyacrylonitrile can be used but for the reason mentioned before it is desirable to limit the composition to polychloroprenes.

As mentioned before the amount of component (2) should be 10 to 90 percent. However, the ability of the articles of the invention to retain their expanded shape but yet deform on heating is due to the presence of component (2). Accordingly in all cases the amount of component (2) should be sufficient to achieve this characteristic. That is, if insufficient component (2) is used it will not remain expanded or, stated in another manner, it will not permit deformation by heat.

The following examples illustrate the invention more specifically with all parts being by weight.

EXAMPLE I

Component (2) described previously is prepared as follows. An emulsion of chloroprene (100 parts), dodecyl mercaptan (0.2 part), disproportioned rosin (5 parts), water (150 parts), caustic soda (0.75 part), sodium salt of formaldehyde-naphthalene sulfonic acid condensate (0.5 part), and sodium sulfite (0.5 part) is prepared. Polymerization is effected in a conventional reactor and under a nitrogen atmosphere by the addition of 3 parts of catalyst which is a mixture containing 1.2 percent potassium ferricyanide and 98.8 percent water. Catalyst is added slowly while maintaining the polymerization temperature at 32° F. At about 90 percent monomer conversion polymerization is stopped by the addition of a mixture of phenothiazine and 4-tert-butylcatechol. The latex is then stabilized by the addition of 1.5 parts water, 0.2 part sodium laurylsulfate, 1.5 parts tetraethyl thiuram disulfide, 2 parts toluene, and 0.05 part of the sodium salt of formaldehydenaphthalenesulfonic acid condensate. Unreacted chloroprene is removed by steam stripping, the polymer is acidified with acid, and is then removed by freeze coagulation. The polymer has a Williams Plasticity Number at 100° F. of over 1250, at 150° F. of 240, and at 120° F. of greater than 1000.

EXAMPLE II

This example illustrates the preparation of a polymer suitable as component (1). The procedure is the same as in example 1 of U.S. Pat. No. 3,147,317 which is substantially the same as in example I above except for the catalyst employed and the polymerization temperature. The latter is 122° F. and this results in a polymer which does not have the plasticity-crystallization characteristics possessed by the polymer prepared in example I. The polymer has a Williams Plasticity Number in excess of 1000 at 100° F. but it is also well in excess of 500 at 150° F.

EXAMPLE III

Into a mill are charged 75 parts of the polymer prepared in example II, 25 parts of the polymer prepared in example I, 0.5 part stearic acid, 2 parts magnesium oxide, 10 parts zinc oxide, 1.25 parts 2-mercaptoimidazoline, 37 parts carbon black, 15 parts dioctyl phthalate, 12.5 parts hydrated aluminum silicate, and 1 part of the low temperature reaction product of diphenyl amine and acetone. The mixture is milled for 30 minutes at 150° F. and is then extruded at 170° F. into tubing having an I.D. of 0.5 inch and a wall thickness of 0.070 inch. The tubing is then cured for 20 minutes with 60 p.s.i.g. steam. Finally air pressure is used to expand the tubing to 2 inches I.D. the expansion being conducted at 220° F. The tubing is water cooled to room temperature, the air pressure then released, and the tubing stays in the expanded form. The expanded tubing is elastomeric. When air at 170° F. is blown on the tubing it immediately shrinks within several seconds to an I.D. of 0.5 inch. The shrunken tubing is also elastomeric.

EXAMPLE IV

This example is the same as Example III except the polymer used as component (1) is the commercially available polymer known as "Neoprene W." In addition the amount of this polymer used is 50 parts and the amount used of the polymer prepared in example III is 50 parts. The expanded tubing shrinks upon the application of heat in the same manner as described in example III.

EXAMPLE V

A chloroprene polymer is prepared in a manner similar to that described in example II except that no mercaptan is used. Accordingly the polychloroprene contains no sulfur in the polymer chain. In addition the polymerization temperature is about 68° F. rather than 122° F. the effect of which is to yield a polymer with a higher crystallization rate. The polymer has a Williams Plasticity Number of greater than 1000 at 100° F., of 400 at 150° F., and of about 500 at 120° F. The procedure of example III is then followed using 25 parts of this polymer and 75 parts of the polymer prepared in example I but instead of using 15 parts dioctylphthalate 15 parts of butyl oleate are used. The expanded tubing shrinks upon the application of heat in the same manner as described in example III.

EXAMPLE VI

The procedure is the same as in example V except that 7.5 parts of a fluid chloroprene polymer having a Brookfield viscosity of 550,000 at 122° F. is also added to the mill. The blend becomes uniform more rapidly and the expanded tubing shrinks upon the application of heat in the same manner as described in example III.

What is claimed is:

1. Heat shrinkable, expanded, elastomeric tubing that is substantially dimensionally stable at room temperature in the absence of applied force, said tubing being comprised of from 10 to 90 percent by weight of (1) a cured polychloroprene elastomer, and from 10 to 90 percent by weight of (2) a substantially uncured polychloroprene elastomer having a Williams Plasticity Number at 100° F. in excess of 1000 and at 150° F. of less than 350.

2. Heat shrinkable tubing as in claim 1 capable of being shrunk over pipe joints to provide a tight fitting protective cover.

3. Heat shrinkable tubing as in claim 1 capable of being shrunk over electric wire to provide a jacket thereover.

4. Article according to claim 1 wherein the Williams Plasticity Number of (2) at 150° F. is less than 300.

5. Article according to claim 1 wherein the amount of (2) is 50 to 90 percent and the amount of (1) is 10 to 50 percent.

6. Article according to claim 1 wherein the Williams Plasticity Number of (2) at 150° F. is at least 50 units less than the Williams Plasticity Number at 150° F. of (1) before said curing.

7. Article according to claim 1 further characterized in that the Williams Plasticity Number of (2) at 120° F. is at least 1000 whereas the Williams Plasticity Number of (1) before said curing is substantially less than 1000.

8. Heat shrinkable, expanded, elastomeric tubing that is substantially dimensionally stable at room temperature in the absence of applied force, said tubing being comprised of from 10 to 90 percent by weight of (1) a cured polychloroprene elastomer, and from 10 to 90 percent by weight of (2) a polychloroprene elastomer having a Williams Plasticity Number at 100° F. in excess of 1000 and at 150° F. of less than 350, said Williams Plasticity Number at 150° F. being at least fifty units less than the Williams Plasticity Number at 150° F. of component (1) before curing.

9. A method of forming heat shrinkable, expanded, elastomeric tubing that is substantially dimensionally stable at room temperature in the absence of applied force comprising, mixing from 10 to 90 percent by weight of a first polychloroprene elastomer having a Williams Plasticity Number of less than 1000 with from 50 to 90 percent by weight of a second polychloroprene elastomer having a Williams Plasticity Number at 100° F. in excess of 1000 and at 150° F. of less than 350, said second polychloroprene elastomer having a Williams Plasticity Number at 150° F. of at least fifty units less than the Williams Plasticity Number at 150° F. of said first polychloroprene elastomer, forming into tubing, curing, expanding by application of internal pressure at elevated temperature and cooling.

10. A method of covering objects comprising, applying thereover heat shrinkable, expanded, substantially dimensionally stable tubing and thereafter applying heat to shrink the tubing over the object, said tubing being comprised of from 10 to 90 percent by weight of (1) cured polychloroprene elastomer, and from 10 to 90 percent by weight of (2) a substantially uncured polychloroprene elastomer having a Williams Plasticity Number at 100° F. in excess of 1000 at 150° F. of less than 350.

* * * * *